Nov. 8, 1966  V. E. MICHAEL  3,284,130
COMBINED MOTORCYCLE SPRAY SHIELD AND WINDSHIELD
Filed May 15, 1964  3 Sheets-Sheet 1
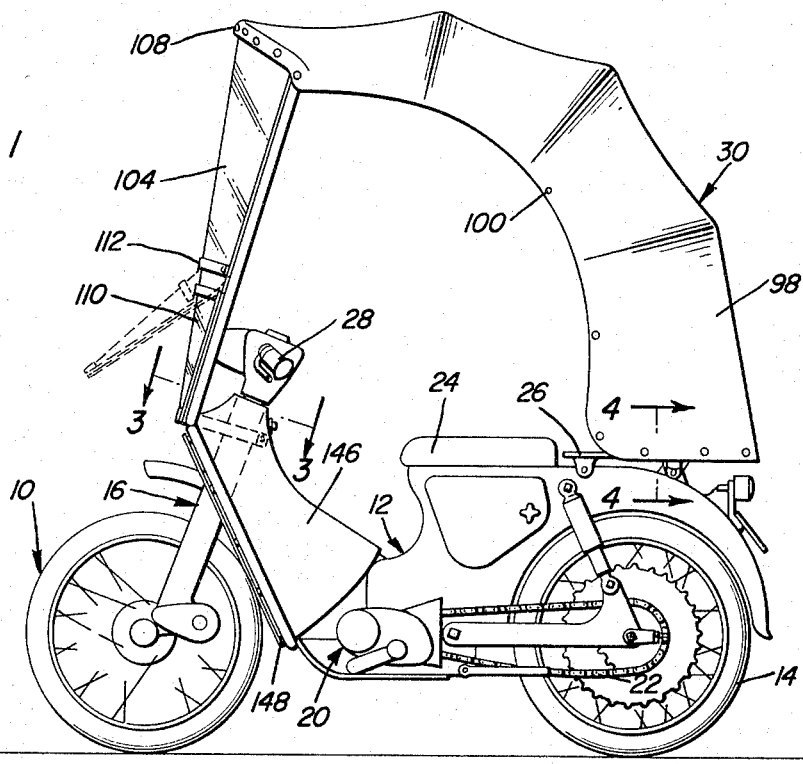
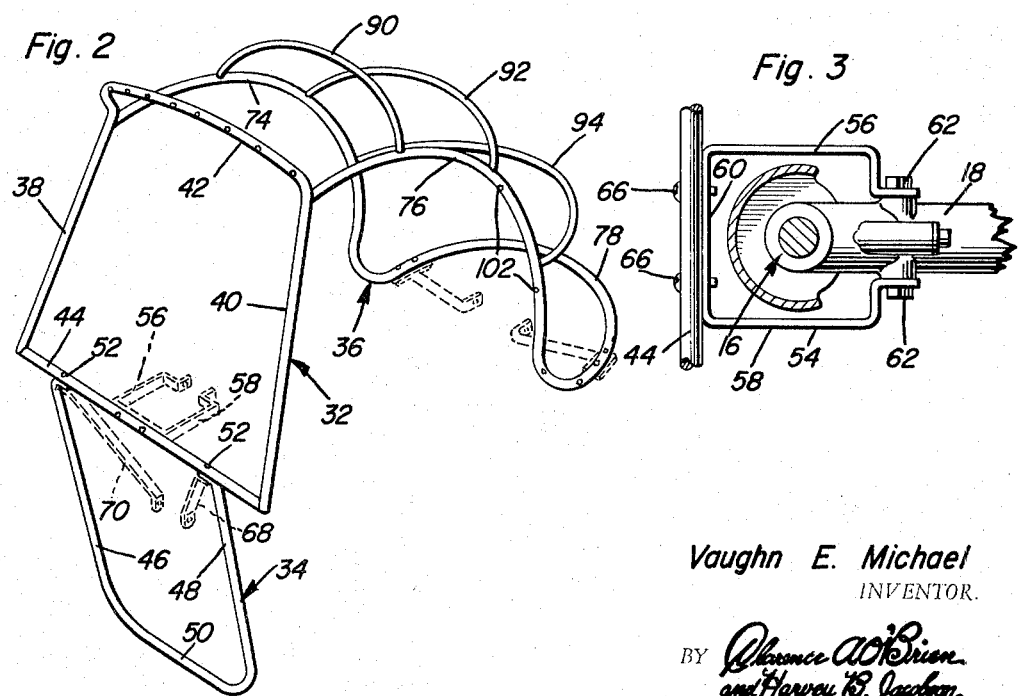
Vaughn E. Michael
INVENTOR.

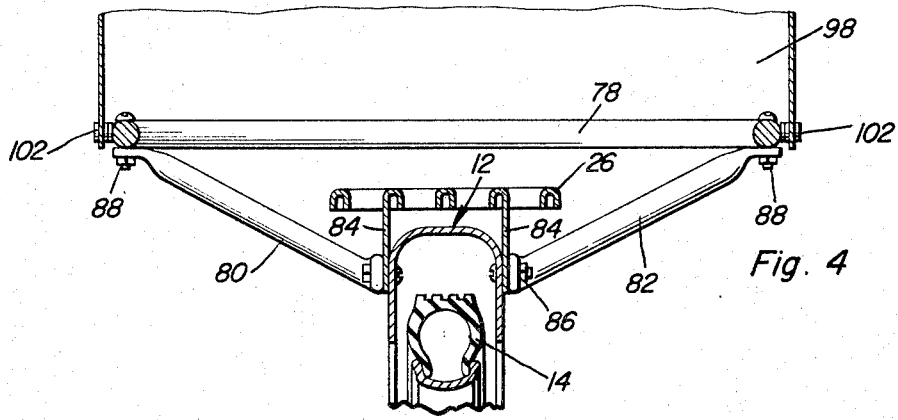
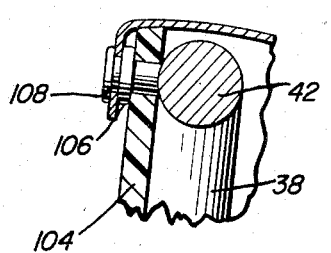
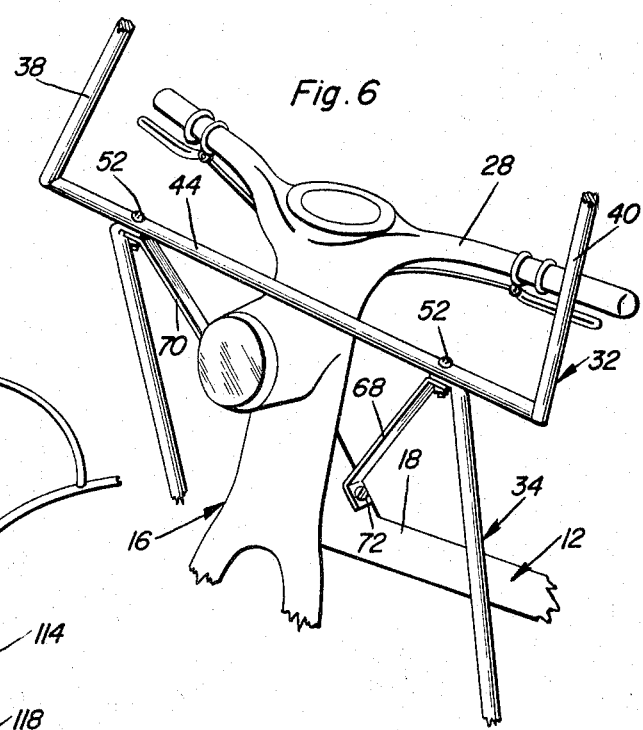
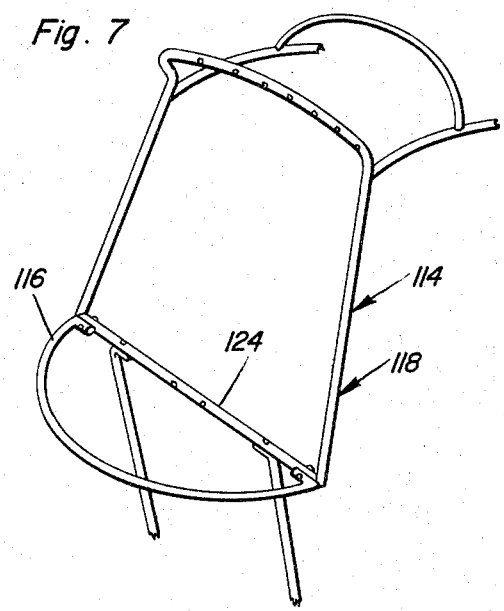

Nov. 8, 1966 V. E. MICHAEL 3,284,130
COMBINED MOTORCYCLE SPRAY SHIELD AND WINDSHIELD
Filed May 15, 1964 3 Sheets-Sheet 3
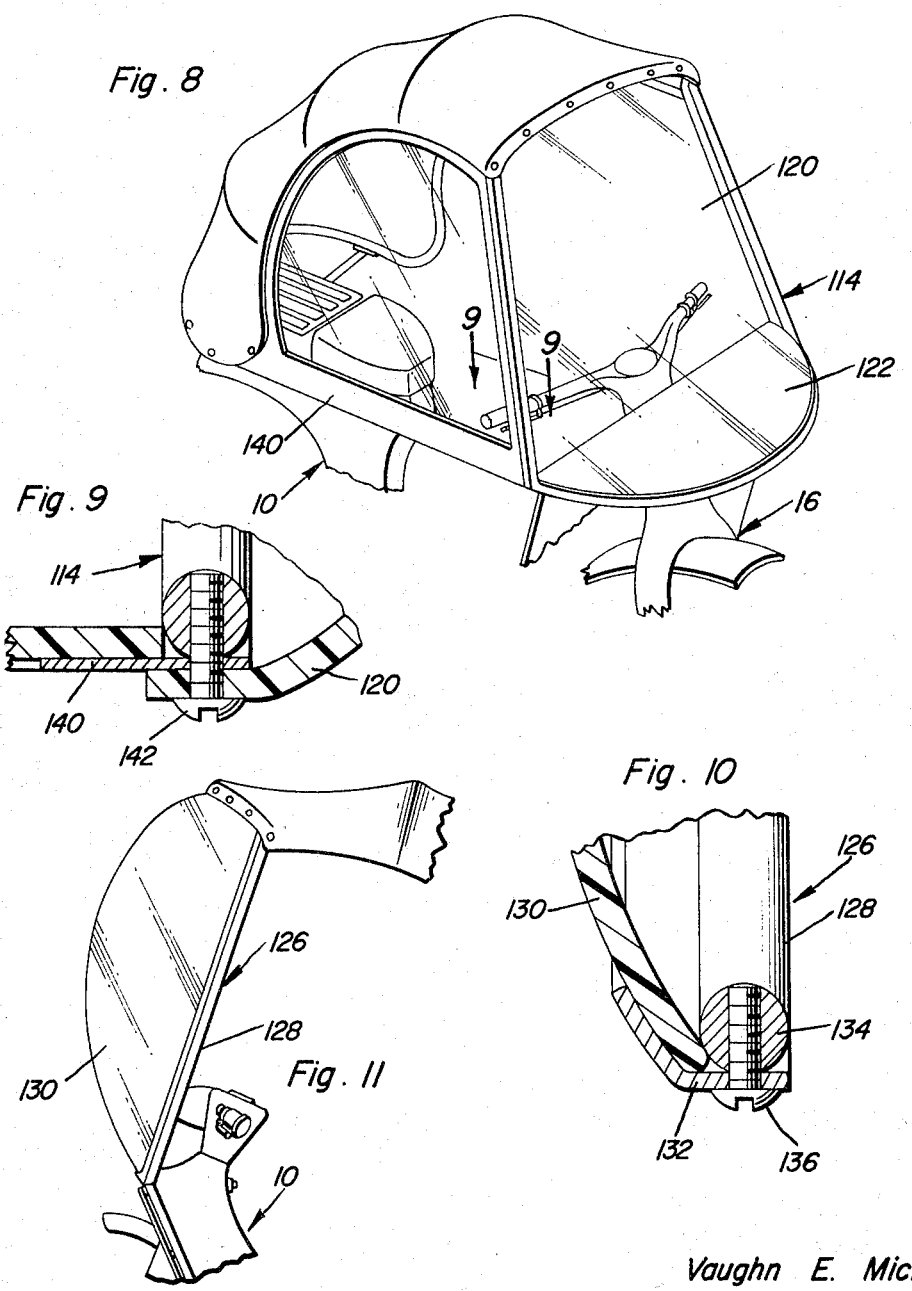
Vaughn E. Michael
INVENTOR.
BY *Clarence A. O'Brien*
*and Harvey B. Jacobson*
Attorneys

United States Patent Office 3,284,130
Patented Nov. 8, 1966

3,284,130
COMBINED MOTORCYCLE SPRAY SHIELD
AND WINDSHIELD
Vaughn E. Michael, John Day, Oreg., assignor of one-fifth each to Dick Clanfield, John Day, E. C. Miley, Athena, Richard Camp, Haines, and Gene C. Rose, Baker, Oreg.
Filed May 15, 1964, Ser. No. 367,684
3 Claims. (Cl. 296—78.1)

This invention relates to a novel and useful combined motorcycle mud guard, windshield and canopy construction and more specifically to an assembly designed for attachment to motorcycles and the like and for protecting the driver of a motorcycle and also a passenger riding behind the driver from the elements.

The windshield and canopy construction of the instant invention is designed primarily for the modern lightweight motorcycles of the type including an upright longitudinally extending main frame having an upstanding front wheel assembly pivotally supported therefrom for rotation about an upstanding axis and including a forwardly and upwardly inclined portion disposed adjacent and immediately rearwardly of the front wheel assembly from whose upper end portion the front wheel assembly is pivotally supported. The windshield and canopy construction of the instant invention includes a detachable mud guard portion, which also serves as an air scoop for ducting ram air to the associated motorcycle engine for cooling the same, an upright windshield assembly disposed slightly forwardly of and above the mud guard portion and a canopy portion or section which extends rearwardly from the upper end of the windshield portion and curves downwardly at its rear end so as to be adapted to enclose the driver of the motorcycle and protect him from the elements. Still further, the windshield and canopy construction of the instant invention further includes side panel means which may be removably secured between corresponding side portions of the windshield and canopy frames. In this manner, not only is the driver of a motorcycle equipped with the windshield and canopy construction of the instant invention protected from the elements coming from in front of, above and to the rear of the associated motorcycle but also from the elements such as wind-driven rain or snow coming from either side of the motorcycle.

In addition to providing maximum shelter for the operator of a motorcycle the windshield and canopy construction of the instant invention also tends to provide a streamlined enclosure about the driver of the associated motorcycle and thereby reduces the wind resistance which would normally be afforded by the conventional type of windshield. This streamlining effect may greatly enhance the performance characteristics of lightweight motorcycles which do not have an abundance of power and therefore it may be seen that the windshield and canopy construction has many advantages including driver protection, increased performance and better engine cooling, etc.

The main object of this invention is to provide a windshield and canopy construction for lightweight motorcycles including means by which the driver of an associated motorcycle may be protected from the elements.

Another object of this invention is to provide a windshield and canopy construction including features also providing protection to a passenger riding behind the driver of the associated motorcycle.

Another object of this invention is to provide a windshield and canopy construction including a portion thereof defining a mud guard whereby the driver of an associated motorcycle and his passenger may also be protected from water spray created by the front wheel of the associated motorcycle.

Still another object of this invention, in accordance with the immediately preceding object, is to provide a combined windshield and canopy construction including a mud guard having structural features enabling it to also function as an air scoop for ram air by means of which ram arm may be diverted to the area of the motorcycle supporting the air cooled engine thereof thereby insuring adequate cooling of an air cooled engine.

A further object of this invention is to provide a windshield and canopy construction for motorcycles constructed in a manner whereby the construction may be readily mounted on existing motorcycles with a minimum amount of work involved.

A still further object of this invention, in accordance with the immediately preceding object, is to provide a combined windshield and canopy construction constructed in a manner whereby it may be readily adapted for use on various types of motorcycles with only slight changes being required in the mounting brackets of the windshield and canopy construction.

A further object of this invention is to provide a device in accordance with the preceding objects constructed in a manner whereby it may be readily removed from an associated motorcycle with a minimum amount of effort.

Another important object of this invention is to provide a windshield and canopy construction designed so as to be adaptable for manufacture by use of readily available inexpensive materials.

A final object of this invention to be specifically enumerated herein is to provide a combined windshield and canopy construction for motorcycles which will conform to conventional forms of manufacture, be of simple construction and easy to install so as to provide a device that will be economically feasible, long-lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a modern type of lightweight motorcycle shown with the windshield and the canopy construction of the instant invention mounted thereon;

FIGURE 2 is a perspective view of the windshield, canopy and mud guard frames of the consruction, said frames being illustrated in an assembled integral unit and with various mounting brackets illustrated in phantom lines;

FIGURE 3 is an enlarged fragmentary horizontal sectional view taken substantially upon the plane indicated by section line 3—3 of FIGURE 1;

FIGURE 4 is an enlarged fragmentary transverse vertical sectional view taken substantially upon the plane indicated by section line 4—4 of FIGURE 1;

FIGURE 5 is a fragmentary enlarged longitudinal vertical sectional view taken substantially upon a plane passing through an upper marginal edge portion of the windshield and showing the manner in which the windshield panel and forward end of the canopy cover are supported from the windshield frame;

FIGURE 6 is a fragmentary perspective view of the forward end of the motorcycle illustrated in FIGURE 1 of the drawings shown with the windshield and mud guard panels removed so as to more clearly illustrate the manner in which the windshield and mud guard frames may be supported from an associated motorcycle;

FIGURE 7 is a fragmentary perspective view of a modified form of windshield and canopy construction;

FIGURE 8 is a further perspective view of the modified form of windshield and canopy construction illustrated in FIGURE 7 but shown with the windshield, canopy and side panels attached;

FIGURE 9 is a fragmentary enlarged horizontal sectional view taken substantially upon a plane indicated by section line 9—9 of FIGURE 8;

FIGURE 10 is a fragmentary side elevational view of the forward portion of a motorcycle showing a still further modified form of windshield and canopy construction utilizing a bubble-type windshield panel; and FIGURE 11 is a frangmentary enlarged longitudinal vertical sectional view taken substantially upon a plane passing through a lower marginal edge portion of the windshield frame of the modified form of windshield and canopy construction illustrated in FIGURE 10.

Referring now more specifically to the drawings, the numeral 10 generally designates a modern-type of lightweight motorcycle including a main frame generally referred to by the reference numeral 12 from whose rear end a rear drive wheel 14 is rotatably supported, an upstanding front wheel assembly generally referred to by the reference numeral 16 being rotatably supported from the upper end of a forwardly and upwardly inclined portion 18 of the frame 12.

A motor and transmission assembly 20 is supported from the main frame 12 and drivingly coupled to the rear wheel 14 by means of an endless chain 22 in the conventional manner. The main frame 12 includes a driver's seat 24 and a passenger seat or package rack 26 disposed immediately behind the driver's seat 24. Further, the front wheel assembly 16 includes a transversely extending hand bar assembly 28. The combined motorcycle mud guard, windshield and canopy construction of the instant invention is generally referred to by the reference numeral 30 and the structural features of this one embodiment may be seen from FIGURES 1–6 of the drawings.

With particular attention invited to FIGURES 2–6 of the drawings, it may be seen that the construction 30 includes a generally rectangular and upright windshield frame generally referred to by the reference numeral 32, a depending rearwardly and downwardly inclined mud guard frame 34, and a rearwardly directed and downwardly curving canopy frame generally referred to by the reference numeral 36.

The windshield frame 32 includes a pair of opposite side uprights 38 and 40 which are interconnected at their upper ends by means of an upper transverse member 42 and at their lower ends by means of a lower transverse member 44. The mud guard frame 34 is substantially U-shaped in configuration and includes a pair of rearwardly and downwardly inclined support arms 46 and 48 which are interconnected at their lower ends by means of an integral bight portion 50 and secured to the lower transverse member 44 at their upper ends by means of fasteners 52.

It may be seen from FIGURES 3 and 6 of the drawings that a first generally U-shaped brace 54 is provided and includes a pair of legs 56 and 58 interconnected with one pair of corresponding ends by means of an integral bight portion 60. The free ends of the legs 56 and 58 are secured to the forwardly and upwardly inclined portion 18 of the main frame 12 by means of fasteners 62 and the bight portion of the bracket or brace 54 is secured to the center portion of the lower transverse member 44 in any convenient manner such as by fasteners 66. The lower transverse member 44 is also secured to the forwardly and upwardly inclined portion 18 of the main frame 12 by means of diagonal brace members 68 and 70 which are secured to the lower transverse brace member 44 at one pair of corresponding ends by means of the fasteners 52 and to opposite sides of the portion 18 of the main frame 12 by means of fasteners 72.

Still further, from FIGURE 2 and of the drawings it may be seen that the canopy frame 36 includes a pair of rearwardly directed and downwardly curving side members 74 and 76 which are supported at their forward ends from the upper end portions of the opposite side members 38 and 40, respectively, and which are interconnected at their lower rear ends by means of a generally horizontally disposed and forwardly opening integral U-shaped portion 78 which is in turn braced from the passenger seat or package rack 26 by means of a pair of brace members 80 and 82 secured at one pair of corresponding ends to the passenger seat brackets 84 by means of fasteners 86 and at the other pair of corresponding ends to the U-shaped portion 78 by means of fasteners 88.

The canopy frame 36 includes a pair of bowed laterally spaced transverse members 90, 92 and 94 which are secured between the opposite side members 74 and 76 in any convenient manner. Further, the opposite side members 74 and 76 may have their forward end portions removably secured to the upper end of the opposite side members 38 and 40 if desired whereby the canopy frame 36 could be removed. Further, it is to be understood that the mud guard frame 34 may be readily removed by removing the fasteners 52 and withdrawing the upper ends of the arms 46 and 48 from between the upper ends of the braces 70 and 68 and the lower transverse brace 44.

A flexible cover panel 98 is secured over the canopy frame 36 by means of coacting snap fasteners 100 and 102 carried by the cover 98 and frame 36.

The windshield frame 32 has an upper transparent panel 104 secured across its upper portion in any convenient manner and to the transverse brace or member 42 by means of a plurality of snap fastener elements or fasteners 106 supported from the transverse member 42. In addition, the forward edge portion of the cover 98 includes snap fastener elements 108 which are releasably engageable with the snap fastener elements 106 so as to secure the forward end of the cover 98 to the transverse member 42 and the upper marginal portion of the transparent panel 104.

A second lower transparent panel 110 extends across the lower portion of the windshield frame 32 and is hingedly supported at its upper marginal edge portion by means of a flexible hinge 112 to the lower marginal edge portion of the transparent panel 104 and includes opposite side marginal edge portions adapted to abut the forward surfaces of the side uprights 38 and 40 to limit rear swinging movement of the lower marginal edge portion of the panel 110.

Inasmuch as the lower portion of the windshield frame 32 is disposed but slightly forwardly of the front wheel assembly 16, when the motorcycle executes sharp turns the opposite ends of the handle bar assembly 28 will engage the lower transparent panel 110. However, inasmuch as the transparent panel 110 is pivoted for forward swinging movement of its lower end portion, as soon as the handle bar assembly 28 engages the lower portion of the transparent panel 110, it will be pivoted toward the raised position illustrated in phantom lines in FIGURE 1 of the drawings so as to provide clearance for the handle bar assembly 28.

With attention now directed more specifically to FIGURES 7 and 8 of the drawings there will be seen a modified form of canopy construction generally referred to by the reference numeral 114 which is identical in all respects to the windshield and canopy construction 30 excepting for being provided with an extra bowed lower transverse member 116 on the windshield frame 118 thereof and a single bowed transparent panel 120 in lieu of the panels 104 and 110. The bowed panel 120 provides the necessary clearance for the handle bar assembly 28 when executing sharp turns and it may also be seen that the modified form of canopy construction 114 includes a closure panel 122 which is secured to the bowed transverse member 116 and the straight transverse member 124 corresponding to the transverse member 44. The closure panel 122 encloses a lower portion of the windshield frame 118 and thereby prevents spray from swirling upwardly beneath the lower end of the bowed transparent panel 120.

With attention now directed to FIGURES 10 and 11 of the drawings there will be seen a still further modified form of canopy construction generally referred to by the reference numeral 126 and which is substantially identical to the canopy construction 30 excepting for the windshield frame 128 and bubble-type transparent windshield panel 130 thereof. It is to be understood that the upper marginal edge portion of the bubbletype windshield panel is secured to the frame 128 in the same manner in which the upper transparent panel 104 is secured to the frame 32. In addition, it may be seen that a retaining flange 132 is secured to the lower portion of the transverse member 134 of the frame 128 corresponding to the transverse member 44 and that the retaining flange 132 snugly secures the lower marginal edge portion of the bubble-type transparent windshield panel 130 to the frame 128 by means of fasteners 136 securing the retaining flange 132 to the transverse member 134.

With attention now invited to FIGURES 8 and 9 of the drawings it may be seen that the windshield and canopy construction 114 also includes a pair of opposite side panels 140 which may be removably secured between corresponding edge portions of the windshield and canopy frames of the windshield and canopy construction 114 in any convenient manner such as by clampingly securing marginal portions of the panels 140 between adjacent frame portions of the construction 114 and corresponding portions of the cover and the transparent panel 120 of the construction 114. Fasteners 142 are utilized to clamp the forward edge portions of the side panels 140 between the opposite side uprights of the windshield frame of the windshield and canopy construction 114 and the opposite side marginal edge portions of the transparent windshield panel 120 of the windshield and canopy construction 114 and fasteners similar to fasteners 142 may be used to clamp the notched rear downwardly curved edge portions of the panels 140 between the corresponding portions of the frame and cover of the construction 114.

It is also to be understood that opposite side panels corresponding to the side panels 140 may also be utilized in conjunction with the windshield and canopy constructions 30 and 126. Still further, with attention now directed again to FIGURE 1 of the drawings, it may be seen that the windshield and canopy construction 30 includes a mud guard portion 146 comprising a flexible panel extending between the rearwardly and downwardly inclined arms 46 and 48 of the mud guard frame 34 and secured thereto by means of snap fasteners 148. The flexible panels 146 extends over the forwardly and upwardly inclined portions 18 of the frame 12 and it is to be understood that the mud guard portion of the windshield and canopy construction 30 may also comprise a part of the windshield and canopy constructions 114 and 126.

Inasmuch the flexible panel 146 opens toward the front of the motorcycle 10, the air against which the motorcycle 10 is advanced is ducted rearwardly and downwardly toward the motor and transmission assembly 24 more effectively air cooling the latter.

In view of the foregoing, it is believed that it may be readily seen that the combined motorcycle mud guard windshield and canopy constructions illustrated and described herein have many advantages including ease of installation, substantially complete protection from the elements, increased streamlining, and more efficient air cooling of the associated air cooled motorcycle engines. Still further, the combined motorcycle mud guard, windshield and canopy constructions 30, 114 and 126 are constructed in a manner whereby they may be readily adapted for use on various types of motorcycles merely by changing the various supporting brackets thereof corresponding to the brackets 68, 70, 54, 80 and 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motorcycle including upright longitudinally extending main frame having a rear wheel journalled at its rear end for rotation about a transevrse horizontal axis and an upstanding front wheel assembly pivotally supported at its forward end for oscillation about an upstanding axis and including laterally directed handle bar means at its upper end, a windshield and spray shield construction, said construction comprising an upright windshield frame, means securing said frame to an upper portion of the front end of said main frame, said construction also including means defining a pair of support arms projecting rearwardly and downwardly from opposite side portions of the lower end portion of said windshield frame, said main frame including a forwardly and upwardly inclined forward portion from whose upper end said front wheel assembly is pivotally supported, and an upstanding flexible spray shield secured between said arms and passed over said forwardly and upwardly inclined portion of said main frame, said support arms generally paralleling said forwardly and upwardly inclined portion of said main frame and being disposed forwardly of said upwardly inclined portion.

2. In combination, a motorcycle including an upright longitudinally main frame having a rear wheel journalled at its rear end for rotation about a transverse horizontal axis and an upstanding front wheel assembly pivotally supported at its forward end for oscillation about an upstanding axis and including laterally directed handle bar means at its upper end, a combined windshield and spray shield construction comprising an upright windshield frame including a pair of upstanding opposite side members interconnected at their upper ends by means of an upper cross member, said windshield frame including means securing said frame to the forward end of said main frame and with said windshield frame disposed forwardly of the axis of rotation of said front wheel assembly and the lower portion of said windshield frame generally horizontally aligned with said handle bar means, said main frame including a forwardly and upwardly inclined forward portion from whose upper end said front wheel assembly is pivotally supported, said windshield and spray shield construction also including means defining a pair of support arms projecting rearwardly and downwardly from opposite side portions of the lower end portion of said windshield frame, and an upstanding flexible spray shield secured between said arms and passed over said forwardly and upwardly inclined portion of said main frame, said support arms generally paralleling said forwardly and upwardly inclined portion of said main frame and being disposed forwardly of said upwardly inclined portion.

3. In combination with a motorcycle including upright longitudinally extending main frame means having a rear wheel journalled at its rear end for rotation about a transverse horizontal axis and an upstanding front wheel assembly pivotally supported at its forward end for oscillation about an upstanding axis and including laterally directed handle bar means at its upper end, a spray shield construction comprising a support frame secured to an upper portion of the front end of said main frame means, said main frame means including a forwardly and upwardly inclined forward portion from whose upper end said front wheel assembly is pivotally supported, said support frame including means defining a pair of support arms projecting rearwardly and downwardly on opposite sides of said forwardly and upwardly inclined portion and disposed forwardly of the latter, and an upstanding spray shield secured between said arms and passed over said forwardly and upwardly inclined portion of said main frame means.

References Cited by the Examiner

UNITED STATES PATENTS

| | | | |
|---|---|---|---|
| 1,357,239 | 11/1920 | Krok | 296—78.1 |
| 1,534,067 | 4/1925 | Owen | 296—78.1 |
| 1,620,166 | 3/1927 | Parker | 160—180 |
| 3,154,342 | 10/1964 | Mueller | 296—78.1 |

FOREIGN PATENTS

| | | |
|---|---|---|
| 1,171,618 | 11/1958 | France. |
| 1,175,543 | 11/1958 | France. |
| 1,023,354 | 1/1958 | Germany. |
| 220,532 | 8/1924 | Great Britain. |

BENJAMIN HERSH, *Primary Examiner.*

J. A. PEKAR, *Assistant Examiner.*